Oct. 20, 1970 B. SOROKA 3,535,609
HIGH VOLTAGE, CONSTANT CURRENT POWER SUPPLY
Filed April 23, 1969
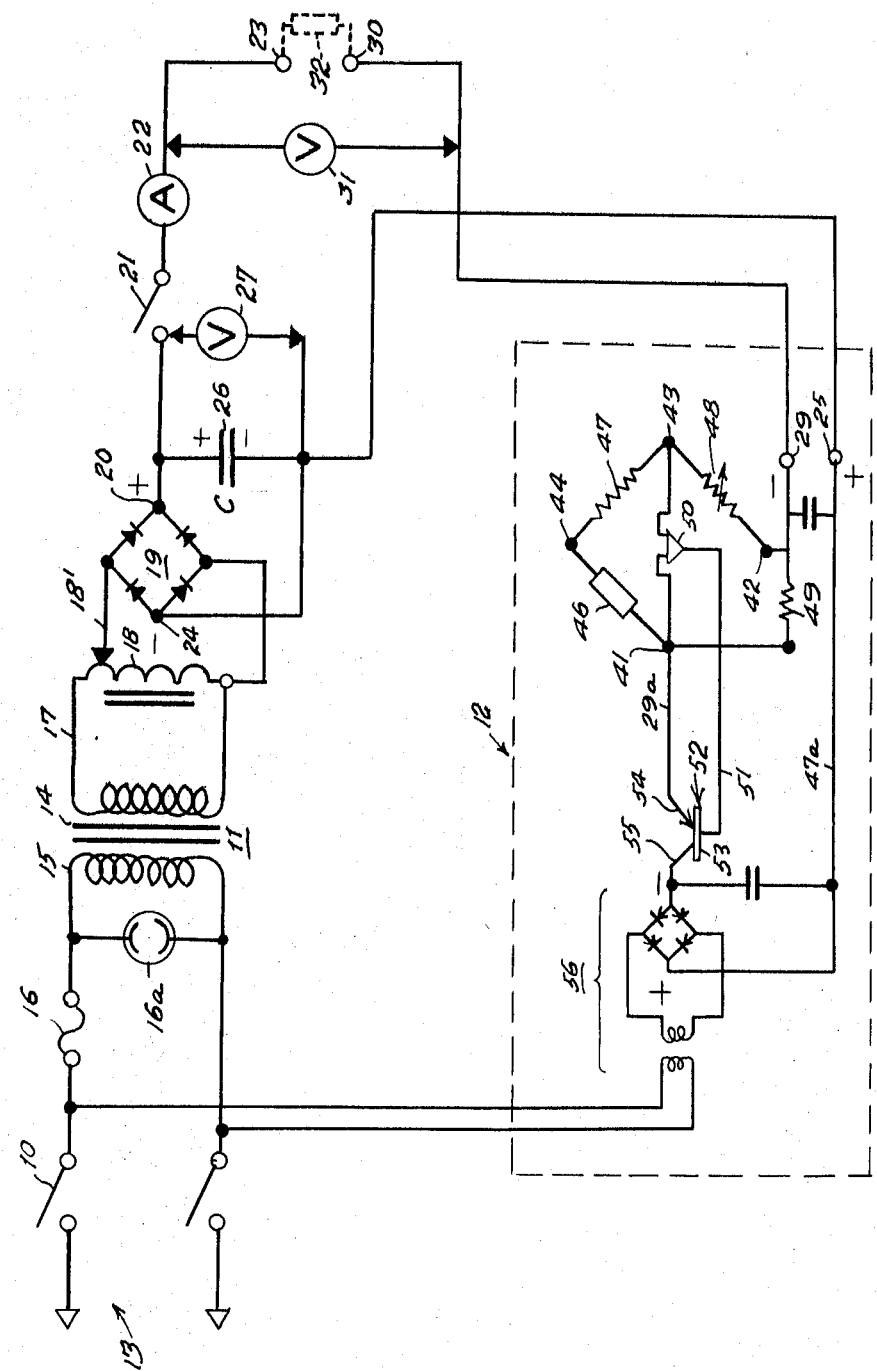
INVENTOR,
Bernard Soroka
BY: Harry M. Saragovitz,
Edward J. Kelly + Herbert Berl
ATTORNEYS.

United States Patent Office 3,535,609
Patented Oct. 20, 1970

3,535,609
HIGH VOLTAGE, CONSTANT CURRENT POWER SUPPLY
Bernard Soroka, Baltimore, Md., assignor to the United States of America as represented by the Secretary of the Army
Continuation-in-part of application Ser. No. 656,949, July 28, 1967. This application Apr. 23, 1969, Ser. No. 818,505
Int. Cl. H02j 7/04
U.S. Cl. 320—39                                            2 Claims

ABSTRACT OF THE DISCLOSURE

A high voltage, constant current power supply consisting of a simple unregulated D-C power supply of relatively high voltage output which is connected in series with the output of a constant current, relatively low voltage output power supply whereby a high voltage, constant current power supply is obtained.

---

The invention described herein may be manufactured, used, and licensed by or for the Government for governmental purposes without the payment to me of any royalty thereon.

This application is a continuation-in-part of my copending application Ser. No. 656,949, filed July 28, 1967.

In many laboratory and field type electronic circuits and equipment the need often arises for a constant current power supply. The requirements all too frequently call for a power supply of relatively high voltage together with high current capabilities which are very heavy, very expensive and furthermore are not generally available.

Accordingly, an object of the invention is a high voltage, constant current D-C power supply possessing flexibility as to voltage and constant current output as well as minimum weight and cost.

A fuller understanding of the invention may be had by referring to the following description and claims taken in conjunction with the sole figure of the drawing in which:

Reference numeral 10 indicates a double pole, single throw switch utilized to place the input of unregulated power supply 11 and the input of regulated, constant current power supply 12 across the 115 volt source 13. In a preferred embodiment, the unregulated power supply 11 consists of a power transformer 14 having a primary winding 15 connected across the 115 volt source 13 through fuse 16 with a pilot 16a in parallel therewith. The turns ratio of primary winding 15 to secondary winding 17 are selected to accommodate the needs of the equipment to be energized by the power supply of the invention and is so selected that the D-C output voltage of the unregulated power supply 11 is in excess of the D-C output voltage of the constant current power supply 12 one embodiment of which is subsequently described. The constant current power supply 12 is a commercially available item. The secondary winding 17 of power transformer 11 is connected in parallel with a Variac 18 for the purpose of selecting the desired or required unregulated output voltage. A bridge rectifier 19 which may consist of four semiconductor diodes in a bridge circuit has one diagonal connected across the rotating arm 18' of Variac 18 and the bottom of Variac 18 as shown in the drawing. The other diagonal of the bridge rectifier 19 has its positive pole 20 connected in series with an ammeter 22 and positive output terminal 23 through switch 21. The negative pole 24 of bridge rectifier 19 is connected to the positive output terminal 25 of the constant current power supply 12. A capacitor 26 is connected across said other diagonal to prevent random fluctuations of the unregulated output voltage. Voltmeter 27 is provided across said other diagonal to provide visual indication of the value of unregulated output voltage. The negative output terminal 29 of constant current power supply 12 is connected to output terminal 30 of the power supply. Thus the outputs of the two power supplies are placed in series with the variable resistance load 32, which may comprise a bank of batteries to be charged, providing a high voltage, current regulated power supply. Voltmeter 31 across output terminals 23 and 30 and ammeter 22 serve as indicators of the voltage across and the current going through the load 32, respectively.

In a preferred embodiment the constant current power supply 12 consists of a regulated output voltage power supply comprising a comparison bridge connected as a voltage regulator shown and described in detail in U.S. Pat. 3,028,538 to which reference is made for details of the operation of the regulation circuit thereof which is adapted for current regulation by coupling the "load resistor 26," subsequently identified as current sensing resistor 49 in the instant specification and drawings, in the negative lead of the unregulated voltage source 56 whereby current fluctuations through resistor 49 cause voltage variations between terminals 41 and 42 of constant current supply 12 corresponding to terminals 21 and 24 of the aforementioned patent. A brief description of the circuit diagram described in detail in the above referred to U.S. patent follows. The circuit includes a bridge-like circuit interconnecting terminals 41, 42, 43 and 44. A reference current is provided and is determined by the voltage of reference voltage 46 divided by the resistance of reference resistor 47. This current is to be matched by a current equal to the voltage between terminals 41 and 42 and across resistance 49 divided by the resistance of variable resistor 48 connected between terminals 42 and 43. Terminal 42 is coupled to the negative output terminal 29 of the supply 12. It is to be noted at this point that when the control circuit is used for maintaining a constant current flow, the resistor 49 is placed in series with the negative lead 29a and negative output terminal 29 and that the voltage developed between terminals 41 and 42 is due to load current flow through the current sensing resistor 49. Error or control amplifier 50 is provided with its input terminals connected between reference terminal 41 and the junction between resistors 47 and 48 at terminal 43 and its output connected over lead 51 to base 53 of the signal control element of series pass transistor 52. The series pass transistor 52 is provided with collector 55 connected to the negative of potential source 56 whose current is to be regulated and with the emitter 54 connected to common point 41. The positive side of source 56 is connected over lead 47a to terminal 25. The action of amplifier 50 together with transistor 52 is to regulate the voltage developed between terminals 41 and 42 due to current flow through current sensing resistor 49 until the voltage between terminals 41 and 43 is substantially zero, resulting in a constant current flow. This condition will pertain when the voltage between terminals 41 and 44 divided by the resistance between terminals 44 and 43 is equal to the voltage between terminals 41 and 42 divided by the resistance between terminals 42 and 43.

In an application of the invention, the variable resistance load 32 consists of a bank of four series connected nickel cadmium batteries, representing a terminal voltage of 112 volts, to be charged by the high voltage constant current supply at the rate of 300 milliamperes. The parameters of the unregulated power supply 11 are selected to provide a selectable D-C output voltage in the range of, for example, 25 to 100 volts. In the instant application an unregulated D-C output voltage of 94 volts is selected by manipulation of Variac 18. The parameters of the constant current supply 12 are such that it is capable of delivering constant current up to 300 milliamperes D-C with a D-C voltage swing of 0 to 36 volts. The control resistor 48 is adjusted to preset the desired output current of 300 milliamperes in the instant case. At the beginning of the charging of the bank of nickel cadmium batteries the total voltage applied thereto is 94 volts by the unregulated high voltage supply 11 with a constant charging current of 300 milliamperes being supplied by the constant current power supply 12. The constant current power supply 12 increases its D-C output voltage, while maintaining the preselected constant current, during the charging period to provide the voltage difference between the D-C output voltage of unregulated power supply 11 and the increase in voltage of the bank of cadmium batteries as it approaches its terminal voltage during the charging period.

Although a specific embodiment of the invention has been illustrated and described, it will be understood that this is but illustrative and that various modifications may be made therein without departing from the spirit of the invention, for example, two such power supplies may be used in parallel, one being a voltage regulated supply used as a control circuit and an uncontrolled variable voltage heavy current supply used as the source of major current. The variable voltage power supply is adjusted so that its output voltage is the voltage required by the load. The control circuit power supply then holds the output voltage supplying the variations in current required by the load.

I claim:

1. A relatively high voltage, constant current D-C power supply for supplying a relatively high voltage, constant current to a variable load comprising in combination, an unregulated D-C power of relatively high voltage output approximating the load voltage requirement of said variable load, a constant current D-C power supply having a relatively low voltage output approximating the voltage difference between said relatively high voltage output and said load voltage requirement connected in series with said relatively high voltage output across said variable load, said constant current D-C power supply having means incorporated therein for automatically producing low voltage output variations in response to the resistance variations in said load, said output voltage variations adding to the output voltage of said unregulated D-C power supply whereby the total output voltage of said relatively high voltage constant current D-C power supply equals said load voltage requirement and the load current maintained at a constant rate.

2. A high voltage, constant current D-C power supply for charging a bank of batteries comprising in combination, an unregulated D-C power supply provided with positive and negative poled output terminals and with means for selecting a D-C output voltage thereof to a value approximating the terminal voltage of said bank of batteries, a constant current D-C power supply provided with positive and negative poled output terminals and having means incorporated therein for automatically maintaining a preselected constant charging current while providing output voltage approximating the difference in voltage between the selected D-C output voltage of said unregulated D-C power supply and said terminal voltage when the outputs of said unregulated D-C power supply and said constant current D-C power are serially connected across said bank of batteries, said bank of batteries having a positive terminal connected to the positive pole of said unregulated D-C power supply and a negative terminal connected to the negative pole of said constant current power supply, the negative pole of said unregulated D-C power supply coupled to the positive pole of said constant current D-C power supply whereby the outputs of said power supplies are connected in additive series across the bank of batteries, said unregulated D-C power supply supplying the approximate terminal voltage of said bank of batteries while said constant current D-C power supply provides a selected constant charging current to said bank of batteries with increasing output voltage to provide the voltage difference between the voltage approximating the terminal voltage provided by the D-C unregulated power supply and the bank of batteries voltage rising to the terminal voltage during the charging period.

References Cited

UNITED STATES PATENTS

| | | | |
|---|---|---|---|
| 3,193,750 | 7/1965 | Chait | 320—22 X |
| 3,226,623 | 12/1965 | Krueger et al. | 320—39 X |
| 3,247,442 | 4/1966 | Medlar | 320—39 |
| 3,401,335 | 9/1968 | Perkinson | 323—9 X |
| 3,413,537 | 11/1968 | Sharp et al. | |
| 3,417,308 | 12/1968 | Mandel et al. | 320—50 X |
| 3,445,745 | 5/1969 | Frezzolini | 320—20 X |

J D MILLER, Primary Examiner

J. M. GUNTHER, Assistant Examiner

U.S. Cl. X.R.

320—32, 56; 323—4